United States Patent
Chen et al.

(10) Patent No.: US 8,305,054 B2
(45) Date of Patent: Nov. 6, 2012

(54) INDUCTIVE CONVERSION DEVICE AND ENERGY CONTROL METHOD

(75) Inventors: Ke-Horng Chen, Taipei (TW); Jean-Shin Wu, Taipei (TW); Yu-Nong Tsai, Taipei (TW); Ming-Yan Fan, Taipei (TW)

(73) Assignee: Alpha & Omega Semiconductor, Inc., Sunnyvale, CA (US)

( * ) Notice: Subject to any disclaimer, the term of this patent is extended or adjusted under 35 U.S.C. 154(b) by 416 days.

(21) Appl. No.: 12/686,587

(22) Filed: Jan. 13, 2010

(65) Prior Publication Data

US 2011/0089917 A1    Apr. 21, 2011

(30) Foreign Application Priority Data

Oct. 20, 2009    (TW) .............................. 98135387 A

(51) Int. Cl.
*G05F 3/16*    (2006.01)

(52) U.S. Cl. ....................... 323/225; 323/284
(58) Field of Classification Search .................. 323/222, 323/224, 225, 282–285; 361/152–159
See application file for complete search history.

(56) References Cited

U.S. PATENT DOCUMENTS

| | | | | |
|---|---|---|---|---|
| 5,347,419 | A * | 9/1994 | Caron et al. | 361/154 |
| 6,522,110 | B1 * | 2/2003 | Ivanov | 323/267 |
| 6,737,838 | B2 * | 5/2004 | Sluijs et al. | 323/225 |
| 7,265,524 | B2 * | 9/2007 | Jordan et al. | 323/225 |
| 7,432,614 | B2 * | 10/2008 | Ma et al. | 307/31 |
| 7,723,965 | B2 * | 5/2010 | Lesso et al. | 323/225 |

* cited by examiner

*Primary Examiner* — Rajnikant Patel
(74) *Attorney, Agent, or Firm* — Chein-Hwa Tsao; C H Emily LLC

(57) ABSTRACT

An energy control method for a inductive conversion device comprising: determination of individual error of multiple output voltages; determination of peak current based on the errors, determination of total energy through the peak current and charging to at least one inductor according to the peak current, whereas the inductor will store the total energy.

20 Claims, 4 Drawing Sheets

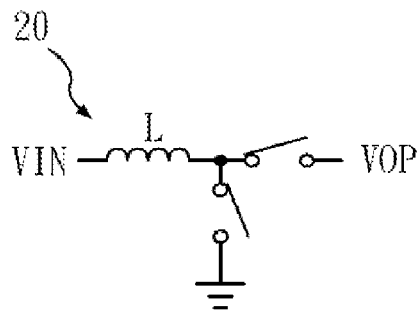
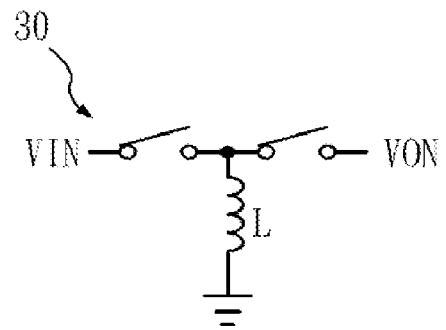
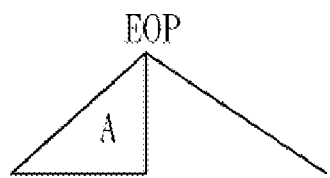
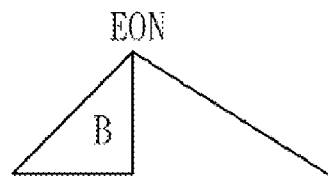
Fig. 2a
Fig. 2b
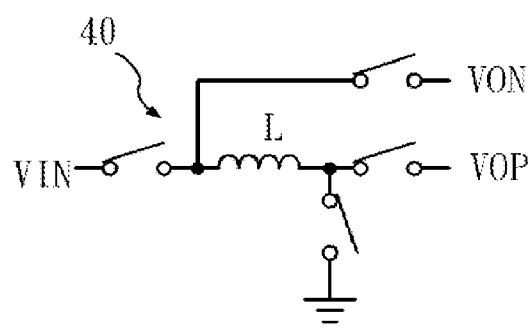
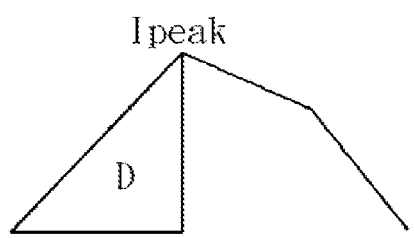
Fig. 2c

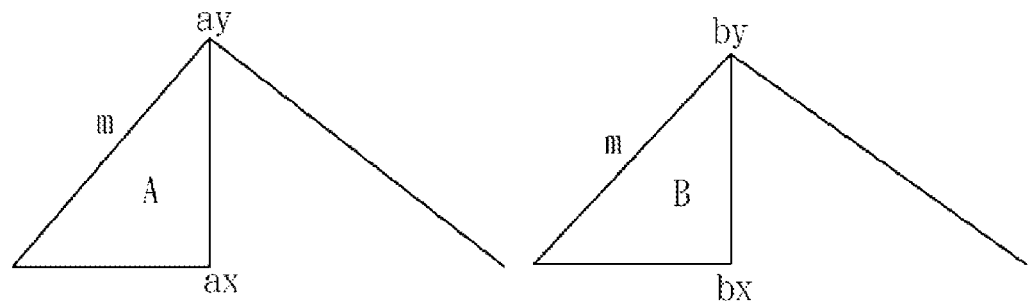
Fig. 3a
Fig. 3b
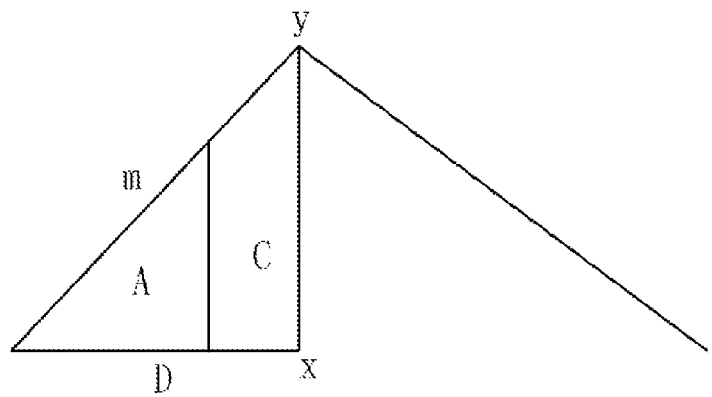
Fig. 3c
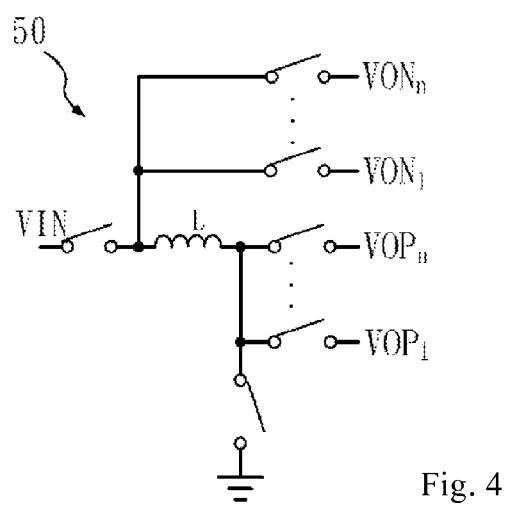
Fig. 4

INDUCTIVE CONVERSION DEVICE AND ENERGY CONTROL METHOD

This application is based upon and claims the foreign priority of a pending Taiwanese patent application filed on Oct. 20, 2009 with Taiwan App #98135387.

TECHNICAL FIELD

This invention relates to an electronic circuit device and energy effectiveness control method, especially an inductive conversion device and energy control method applied to power circuit conversion devices.

BACKGROUND TECHNOLOGY

Nowadays, many industrial applications and various electronic products have the design of power circuit, which will include a converter circuit, and the most common converter circuit will be equipped with an inductor. The U.S patent No. US2006/0114624, for example, proposes a converter system and control method with single inductor and multiple outputs, which feeds back the output voltage and dynamically generates reference current ($I_{REF}$) through reference voltage generator and switching controller to control the inductor charging and discharging of the converter. However, charging the inductor with this reference current ($I_{REF}$) as current threshold will result in energy exceeding the actual energy demand of the system, so the converter's energy effectiveness is not high.

Therefore, ISSCC/2007 thesis "A Single-Inductor Step-Up DC-DC Switching Converter with Bipolar Outputs for Active Matrix OLED Mobile Display Panels" proposes the addition of a free-wheeling switch to connect with the inductor in parallel. When this switch is closed, a short-circuit path will be formed, and the charging current will not flow through inductor, so the energy is eliminated through the short-circuit path to limit the energy stored in the inductor. However, although the method of forming a short-circuit path through free-wheeling switch can effectively solve the problem of energy exceeding the actual demand of the system by releasing the energy, the excessive energy is released through grounding in the process of energy release, thus rendering the energy effectiveness even more inferior than the technology disclosed in the above-mentioned U.S patent.

In view of this, this invention discloses an inductive conversion device and energy control method to resolve the above problem based on electrical and electronic technology and energy control concept.

SUMMARY OF INVENTION

This invention aims to solve the technical problem of poor energy utilization of the converter equipped with an inductor.

In order to achieve the above aim, this invention provides an energy control method of inductive conversion device, including: determination of individual error of multiple output voltages; generation of a peak current based on the error, and determination of total energy through the peak current; as well as charging to at least one inductor according to the peak current, and the inductor will store the total energy.

In order to achieve the above aim, this invention provides an inductive energy conversion device, including:

A switch circuit, electrically connected to at least one inductor, which will control the charging and discharging of the inductor to output multiple output voltages;

A current sensor electrically connected to the inductor, which senses the inductive current flowing through the inductor;

A peak current generator electrically connected to the switch circuit, which receives the error of the output voltage and generates a peak current corresponding to the error;

A comparator set, electrically connected to the peak current generator, which compares the peak current with the inductive current and the error, and generates multiple voltage signals; as well as A control circuit, electrically connected to the comparator set, which receives the voltage signal to generate multiple control signals, and control the switch circuit through these control signals, thus controlling the charging and discharging of the inductor.

The beneficial effects of this invention lie in that it disclosed an inductive conversion device and energy control method, which measures individual error of multiple output voltages with reference voltage as basis; generates a peak current based on the error voltage, and determines the total energy through the peak current, wherein the peak current is the up limit of maximum charging current; charges to at least one inductor with peak current, and the inductor will store the total energy, i.e. the inductor will store the energy demand of the system.

This invention provides an inductive conversion device and energy control method that uses the error of output voltage to calculate the peak current of charging inductor and obtain the actual demand of total energy, thus effectively boosting the energy efficiency. The invention provides an inductive conversion device and energy control method that utilizes the fact that the total energy area corresponding to the output voltage error equals to the energy area of total energy required by the system to quantify the total energy required by the system based on output voltage error, thus improving the accuracy of energy estimation. The invention further provides an inductive conversion device and energy control method that can be applied in energy determination of various inductive conversion device circuit designs, thus provides extensive scope of application.

The following is detailed description with specific implementation examples in combination with the attached figures, in order to facilitate a better understanding of this invention's aim, technical contents, features and the effectiveness achieved.

BRIEF DESCRIPTION OF DRAWINGS

FIG. 2A~2C are schematic diagrams of single inductive circuit and relative energy of this invention.

FIG. 3A~3C are schematic diagrams of energy area proportion of this invention.

FIG. 4 is the schematic diagram of the circuit structure of Single Inductor Bipolar Multiple Output of this invention.

DETAILED DESCRIPTION OF INVENTION

This invention discloses an inductive conversion device and energy control method, which obtains the up limit of charging current by calculating the peak current, thus knowing the total energy demand of the system. The following is a detailed description of the technical features of this invention with better implementation examples.

Figure 1:
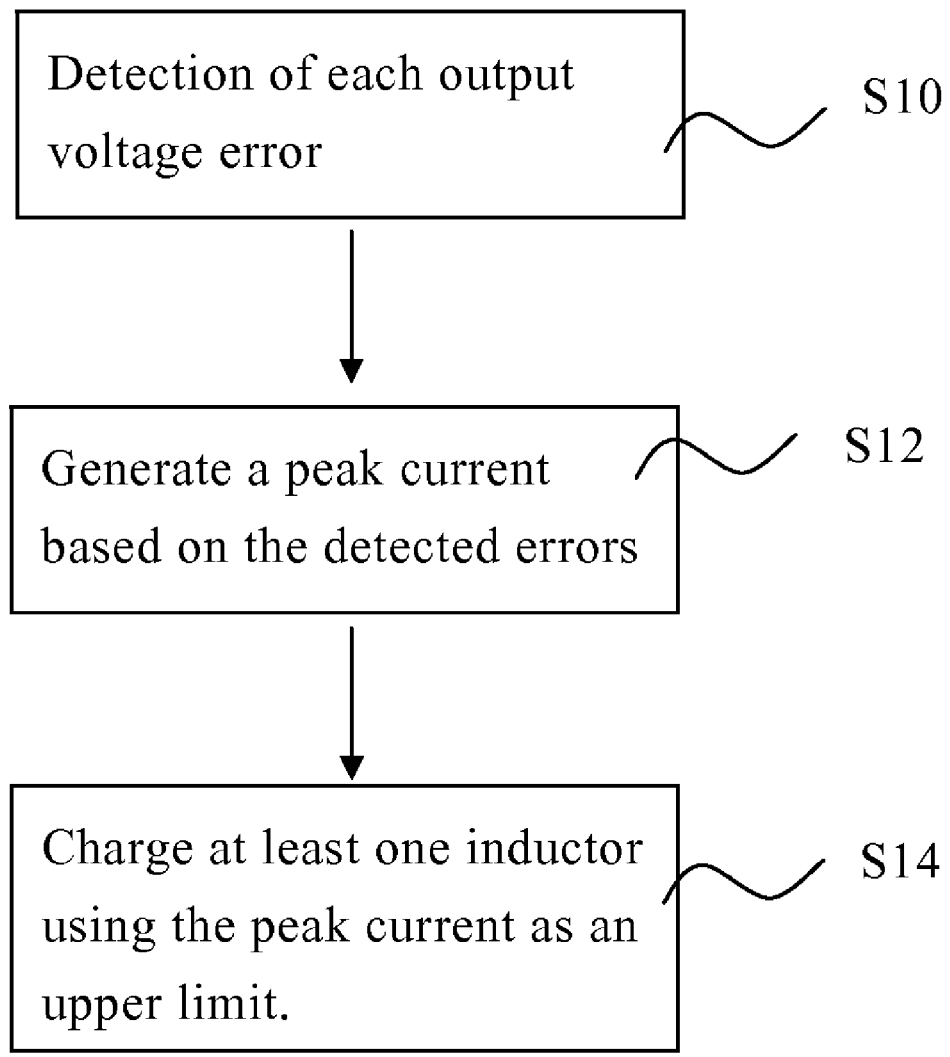
FIG. 1 is the flow chart of controlling inductive charging energy according to this invention.

FIG. 1 is a flow chart of controlling inductive charging energy in this invention. As shown in the figure, firstly, as in Step S10, each individual error of a plurality of output voltages is measured. The output voltage can be either positive voltage or negative voltage of single-voltage output or multiple-voltage simultaneous output, and the error of the output voltage is calculated with a reference voltage as the basis. This reference voltage may be a fixed voltage dependent on the input voltage only and therefore independent of the switching cycles. Then, as in Step S12, a peak current is generated on the basis of the error of output voltage. The peak current is the maximum charging current of each charging cycle in the system, and the charging current will not exceed the up limit of peak current. The total energy demand of the system can be calculated according to the peak current, and the total energy will be the sum of energy of each output voltage. Then, as in Step S14, at least one inductor is charged with the peak current as a charging current up limit, and the inductor will store the total energy, in other words, the energy stored in the inductor is the energy demand of the system.

In addition, when multiple output voltages are output simultaneously, the sequence of load charging may be determined according to the load weight on the basis of peak current and load applied. Heavy load get charge first. Moreover, the value of output voltage may be higher than the value of input voltage.

The fact that the peak current provides the up limit of charging current for energy demand of the system, and that the total energy corresponding to peak current is the sum of energy of each output voltage error can be demonstrated below with single inductor as example, explained in detail as follows:

$$\frac{x_a * y_a}{2} = A; \quad (1)$$

$$y_a = m * x_a \Rightarrow x_a = \frac{y_a}{m}; \quad (2)$$

$$\frac{x_b * y_b}{2} = B; \quad (3)$$

$$y_b = m * x_b \Rightarrow x_b = \frac{y_b}{m}; \quad (4)$$

$$\frac{x * y}{2} = D; \quad (5)$$

$$y = m * x \Rightarrow x = \frac{y}{m}; \quad (6)$$

$$\frac{x_b * y_b}{2} = \frac{(y_a + y)(x - x_a)}{2}; \quad (7)$$

$$y = \pm \sqrt{y_a^2 + y_b^2}; \quad (8)$$

wherein, A is the energy area corresponding to positive output voltage error, $(x_a, y_a)$ is horizontal axis coordinate and vertical axis coordinate of area A, m is the slope of area A, B is the energy area corresponding to negative output voltage error, $(x_b, y_b)$ is horizontal axis coordinate and vertical axis coordinate of area B, m is slope of area B, D is the total energy area of positive and negative bipolar output voltages, (x, y) is horizontal axis coordinate and vertical axis coordinate of area D, m is slope of area D.

Please also refer to FIG. 2A~2C and FIG. 3A~3C as well as Formula (1)~(8) listed above. Boost 20 outputs a positive output voltage ($V_{OP}$) with a voltage error $V_{EOP}=y_a$, whose energy is as shown in Formula (1), and the relationship between $x_a$, $y_a$ of area A and m is as shown in Formula (2). Inverter 30 outputs a negative output voltage ($V_{ON}$) with a voltage error $V_{EON}=y_b$, whose energy is as shown in Formula (3) and the relationship between $x_b$, $y_b$ of area B and m is as shown in Formula (4). By combining boost 20 and inverter 30, we have the single-inductor bipolar output circuit 40, which will output a single positive output voltage ($V_{OP}$) or negative output voltage ($V_{ON}$), or simultaneously output positive and negative bipolar output voltages, with a total voltage error $V_E=y$, whose total energy is as shown in Formula (5), and the relationship between x, y of area D and m is as shown in Formula (6). As the total energy is the sum of energy of each output voltage error, the sum of the energy area of positive output voltage error and the energy area of negative output voltage error equals the total energy area. Therefore, area D equals the sum of area A and area B, and the trapezoidal area C left after subtracting area A from area D will be equal to area B, as shown in Formula (7).

Then, y will be obtained as shown in Formula (8), which means:

$$V_E = (V_{EOP}^2 + V_{EON}^2)^{1/2}$$

The peak current ($I_{peak}$) may be obtained as a function of $V_E$, namely:

$$I_{peak} = f(V_E) = f([V_{EOP}^2 + V_{EON}^2]^{1/2}) \quad (9)$$

Where $f(V_E)$ is the system transconductance function. Therefore, the peak current obtained according to the output voltage error is the charging up limit for energy demand of the system, and it is demonstrated that the total energy corresponding to the peak current is the sum of energy of each output voltage error. In addition, the rising slope m of error energy area A of positive output voltage, error energy area B of negative output voltage and total energy area D is the slope of system charging, and the rising slope m is identical for area A, area B and area D which is determined by the inductor.

In summary, through the above deduction, it is demonstrated that the peak current and total energy can be obtained from the output voltage error, thus further extending application to Single Inductor Dual and Bipolar Output (SIDBO) circuit 50. FIG. 4 shows the schematic diagram of circuit structure of Single Inductor Dual and Bipolar Output (SIDBO) in this invention, which has multiple positive voltage outputs ($V_{OP1}$)~($V_{OPn}$), and multiple negative voltage outputs ($V_{ON1}$)~($V_{ONn}$), and the relationship between peak current error of output voltage will meet the condition as shown in Formula (10):

$$I_{peak} = f(V_E) = f([V_{EOP1}^2 + V_{EOP2}^2 + V_{EOP3}^2 + \ldots \\ + V_{EON1}^2 V_{EON2}^2 + V_{EON3}^2 + \ldots]^{1/2}) \quad (10)$$

Through Formula (10), it is assured that the total energy of bipolar multiple output voltage error is the total energy demand of the system, and the corresponding peak current can be obtained through the energy of output voltage error.

Figure 5:
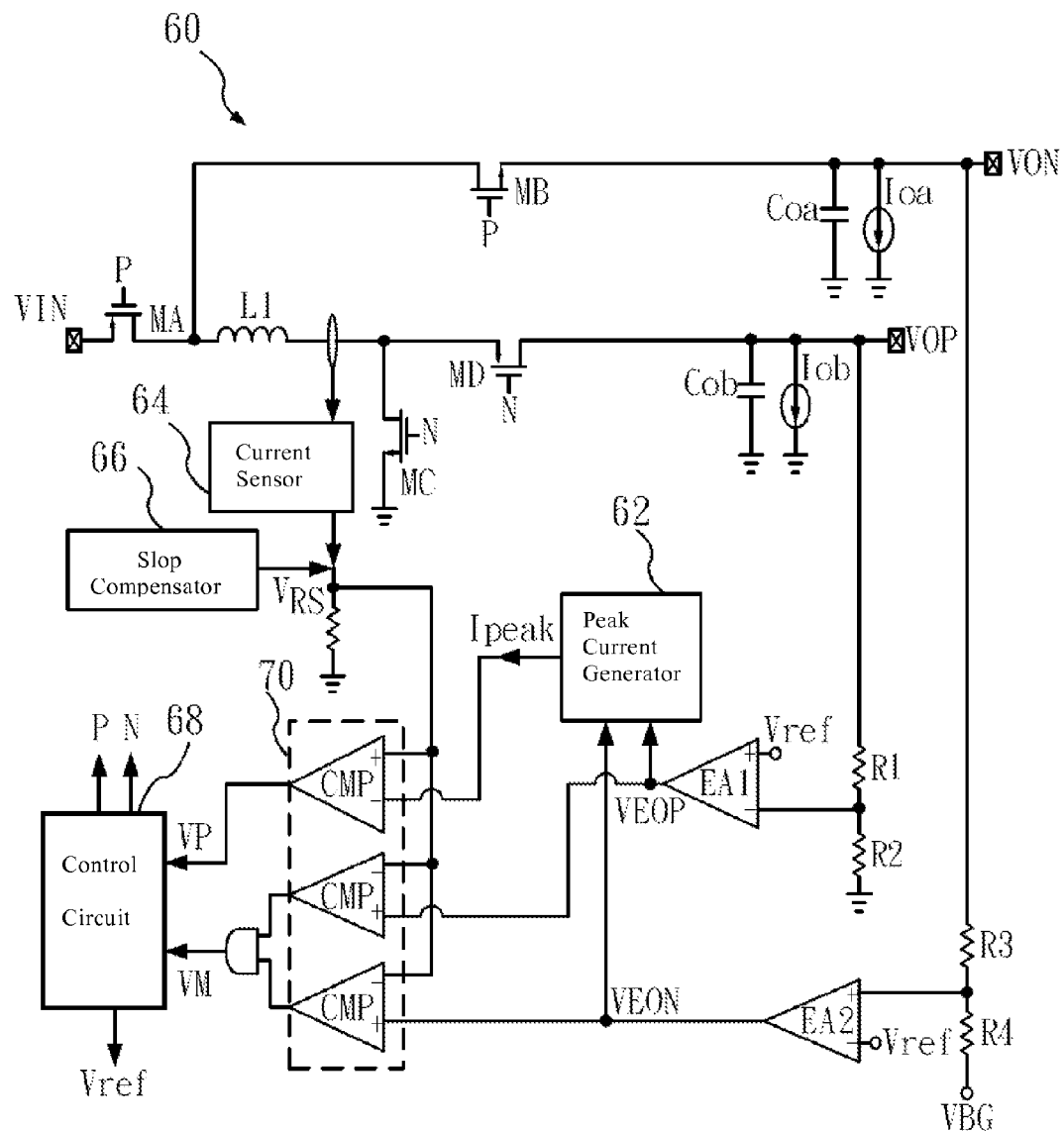
FIG. 5 is the schematic diagram of the circuit structure of inductive energy conversion device according to this invention.

FIG. 5 is a schematic of circuit diagram of an inductive energy conversion device according to this invention. As shown, the inductive energy conversion device 60 outputs positive output voltage ($V_{OP}$) and negative output voltage ($V_{ON}$), which are divided respectively by resistors R1, R2 and R3, R4, then using a reference voltage ($V_{ref}$) as basis. A positive output voltage error ($V_{EOP}$) and a negative output voltage error ($V_{EON}$) are respectively generated by error amplifiers EA1 and EA2. The positive output voltage error ($V_{EOP}$) and negative output voltage error ($V_{EON}$) may be input to a peak current generator 62, which calculates the system total voltage error according to the following equation:

$$V_E = (V_{EOP}^2 + V_{EON}^2)^{1/2}$$

The peak current generator 62 further dynamically generates a peak current ($I_{peak}$) 1 based on the value of $V_E$ as the maximum charging current to limit the inductor charging current which determines the total energy demand for the inductive energy conversion device 60; In case when multiple output voltages are output simultaneously, such as the one shown in FIG. 3, the peak current ($I_{peak}$) 1 in generated as following function:

$$I_{peak} = f(V_E) = f([V_{EOP1}^2 + V_{EOP2}^2 + V_{EOP3}^2 + \ldots + V_{EOP1}^2 V_{EOP2}^2 + V_{EOP1}^3 + \ldots]^{1/2})$$

Comparison is made among the peak current ($I_{peak}$) 1 and positive output voltage error ($V_{EOP}$) and negative output voltage error ($V_{EON}$) as well as inductive current by the comparator set (CMP) 70. The inductive current is the current flowing through the inductor 62, which is sensed by a current sensor 64. The error generated by inductive current variation is compensated by a slope compensator 66, and the inductive current flowing through the joint of the current sensor 64 and the slope compensator 66 is converted into voltage $V_{RS}$ by resistor $R_{RS}$ and input to the comparator set (CMP) 70 to compare with the peak current ($I_{peak}$); after comparison, voltage signals $V_P$ and $V_N$ are generated and input to a control circuit 68, which receives voltage signals $V_P$ and $V_N$ and generates control signals P and N as well as the reference voltage ($V_{ref}$). Alternatively the reference voltage ($V_{ref}$) can be provided by a separate reference generation circuit (not shown) which takes input from a main power supply and outputs $V_{ref}$ according to input voltage VIN, such that $V_{ref}$ is independent from the error determination process. The control signals P and N are used to control the ON and OFF of MA, MB, MC and MD transistor switches in the switch circuit 72, so as to control the charging and discharging of inductor 62, thus able to control the positive output voltage ($V_{OP}$) and negative output voltage ($V_{ON}$) provided by the inductive energy conversion device 60. From the above description of implementation examples, it can be seen that in this invention, the peak current ($I_{peak}$) will be calculated according to the error of output voltage, thus obtaining the demand of total energy, which will be the energy demand of the system. When charging, the peak current ($I_{peak}$) 1 will be taken as the charging threshold, thus effectively controlling the energy demand of the system. In addition, the energy control method disclosed in this invention is not limited to single inductor conversion device, but also applies to multi-inductor conversion device. Moreover, this invention may apply to various power converters including non-isolated boost, buck, buck-boost power converters and isolated forward, full bridge, half bridge, push-pull power converters, as well as their combinations.

The above illustration of this invention is not restrictive but descriptive. It is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not.

The invention claimed is:

1. An energy control method of an inductive conversion device having a plurality of output voltages, the energy control method comprising the step of: a. determining each individual error of said plurality output voltages; b. generating a peak current based on the errors; and C. charging to at least one inductor according to peak current, wherein said at least one inductor stores the total energy of a system powered by the inductive conversion device; the total energy is delivered through said plurality of output voltages; a total output voltage error is the square root of the sum of the square of each output voltage error; and the sum of the positive output voltage error and that of the negative output voltage error equals to the total energy.

2. The energy control method of claim 1, wherein the peak current is an upper limit of a current charging the inductor for each charging cycle.

3. The energy control method of claim 1, wherein the total energy is an energy demand of the system.

4. The energy control method of claim 1, wherein the total energy is the sum of energy of each output.

5. The energy control method of claim 1, wherein the output voltage is a positive voltage or a negative voltage.

6. The energy control method of claim 5, wherein the output voltage is a single voltage output or multiple voltages simultaneously output.

7. The energy control method of claim 6, whereas the output voltage is multiple voltages simultaneously output, the sequence of load charging is determined according to the peak current and the load applied.

8. The energy control method of claim 1 further comprising a step of providing a reference voltage as a basis for determining the output voltage error.

9. The energy control method of claim 1 further comprising an input voltage for providing a current for charging the inductor.

10. The energy control method of claim 9, whereas the output voltage is higher than the input voltage.

11. The energy control method of claim 1, wherein the peak current is a function of total output voltage error.

12. The energy control method of claim 1, wherein the peak current is a system transconductance function of the total voltage error.

13. The energy control method of claim 12, wherein the charging current with a rising slope is limited to a maximum as the peak current.

14. An inductive energy conversion device comprises:
   A switch circuit electrically connected to at least an inductor to control charging and discharging of the inductor therefore providing a plurality of output voltages;
   A current sensor electrically connected to the inductor for sensing an inductive current flowing through the inductor;
   A peak current generator electrically connected to the switch circuit, whereas the peak current generator receives errors of the output voltages and generates a peak current corresponding to the errors;
   A comparator set electrically connected to the peak current generator, whereas the comparator set compares the peak current with the inductive current and the errors, and generates a plurality of voltage signals; and
   A control circuit electrically connected to the comparator set, whereas the control circuit receives the plurality of voltage signals to generate a plurality of control signals for controlling the switch circuit thus controlling the charging and discharging of the inductor.

15. The inductive energy conversion device of claim 14, further comprising a plurality of error amplifiers electrically connected to the peak current generator with the error of the output voltage amplified by the error amplifier with a reference voltage as basis and input into the peak current generator.

16. The inductive energy conversion device in claim 15, wherein the control circuit generates the reference voltage according to the voltage signal received.

17. The inductive energy conversion device in claim 14, further comprises a slope compensator electrically connected to a current sensor for compensating for the error generated due to variation of the inductive current.

18. The inductive energy conversion device of claim 14, wherein the inductive current sensed by the current sensor is converted to a voltage through a resistor and input to the comparator set.

19. The inductive energy conversion device of claim 14, wherein the switch circuit comprises a plurality of transistor switches controlled by the control signals generated by the control circuit.

20. The inductive energy conversion device of claim 16, wherein the peak current generator dynamically generates the peak current according to the output voltage errors.

* * * * *